(12) United States Patent
Nordmark et al.

(10) Patent No.: US 7,738,457 B2
(45) Date of Patent: Jun. 15, 2010

(54) METHOD AND SYSTEM FOR VIRTUAL ROUTING USING CONTAINERS

(75) Inventors: Erik Nordmark, Mountain View, CA (US); Sunay Tripathi, San Jose, CA (US); Nicolas G. Droux, Rio Rancho, NM (US)

(73) Assignee: Oracle America, Inc., Redwood Shores, CA (US)

( * ) Notice: Subject to any disclaimer, the term of this patent is extended or adjusted under 35 U.S.C. 154(b) by 399 days.

(21) Appl. No.: 11/642,756

(22) Filed: Dec. 20, 2006

(65) Prior Publication Data

US 2008/0151893 A1    Jun. 26, 2008

(51) Int. Cl.
*H04L 12/28* (2006.01)
*H04L 12/56* (2006.01)
*H04L 12/66* (2006.01)

(52) U.S. Cl. .................. 370/392; 370/401; 370/409; 370/463

(58) Field of Classification Search .......... 370/389, 370/392, 424, 401, 409, 463
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,131,163 A | 10/2000 | Wiegel | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 7,046,665 B1 | 5/2006 | Walrand et al. | |
| 7,146,431 B2 | 12/2006 | Hipp et al. | |
| 7,177,311 B1 | 2/2007 | Hussain et al. | |
| 7,260,102 B2 | 8/2007 | Mehrvar et al. | |
| 7,313,142 B2 | 12/2007 | Matsuo et al. | |
| 2002/0052972 A1 | 5/2002 | Yim | |
| 2002/0169884 A1* | 11/2002 | Jean et al. | 709/230 |
| 2003/0037154 A1 | 2/2003 | Poggio et al. | |
| 2003/0065676 A1* | 4/2003 | Gbadegesin et al. | 707/104.1 |
| 2004/0267866 A1* | 12/2004 | Carollo et al. | 709/200 |
| 2005/0097226 A1* | 5/2005 | Tripathi | 709/250 |
| 2005/0111455 A1 | 5/2005 | Nozue et al. | |

(Continued)

OTHER PUBLICATIONS

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).

(Continued)

*Primary Examiner*—Alpus H Hsu
*Assistant Examiner*—Saad Hassan
(74) *Attorney, Agent, or Firm*—Osha • Liang LLP

(57) ABSTRACT

In general, the invention relates to a method for routing a packet. The method includes receiving the packet in a network interface card (NIC), classifying the packet, placing the packet in a receive ring of the NIC, sending the packet to a virtual NIC associated with the receive ring, sending the packet to a first container associated with the virtual NIC, and routing the packet to a packet destination using the first container.

17 Claims, 7 Drawing Sheets

U.S. PATENT DOCUMENTS

| | | |
|---|---|---|
| 2005/0135243 A1 | 6/2005 | Lee et al. |
| 2005/0138620 A1 | 6/2005 | Lewites |
| 2006/0041667 A1 | 2/2006 | Ahn et al. |
| 2006/0045089 A1 | 3/2006 | Bacher et al. |
| 2006/0070066 A1 | 3/2006 | Grobman |
| 2006/0174324 A1 | 8/2006 | Zur et al. |
| 2007/0038743 A1* | 2/2007 | Hellhake et al. ............ 709/224 |

OTHER PUBLICATIONS

Tripathi, S.; "Solaris Networking—The Magic Revealed (Part I)"; Sunay Tripathi's Solaris Networking Weblog; Nov. 14, 2005, pp. 1-22 (22 pages).

* cited by examiner

METHOD AND SYSTEM FOR VIRTUAL ROUTING USING CONTAINERS

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. application Ser. No. 11/479,046; "Method and System for Controlling Virtual Machine Bandwidth" with U.S. application Ser. No. 11/480,000; "Virtual Switch" with U.S. application Ser. No. 11/480,261; "System and Method for Virtual Network Interface Cards Based on Internet Protocol Addresses" with U.S. application Ser. No. 11/479,997; "Virtual Network Interface Card Loopback Fastpath" with U.S. application Ser. No. 11/479,946; "Bridging Network Components" with U.S. application Ser. No. 11/479,948; "Reflecting the Bandwidth Assigned to a Virtual Network Interface Card Through Its Link Speed" with U.S. application Ser. No. 11/479,161; "Method and Apparatus for Containing a Denial of Service Attack Using Hardware Resources on a Virtual Network Interface Card" with U.S. application Ser. No. 11/480,100; "Virtual Network Interface Cards with VLAN Functionality" with U.S. application Ser. No. 11/479,998; "Method and Apparatus for Dynamic Assignment of Network Interface Card Resources" with U.S. application Ser. No. 11/479,817; "Generalized Serialization Queue Framework for Protocol Processing" with U.S. application Ser. No. 11/479,947; "Serialization Queue Framework for Transmitting Packets" with U.S. application Ser. No. 11/479,143.

The present application contains subject matter that may be related to the subject matter in the following U.S. applications filed on Jul. 20, 2006, and assigned to the assignee of the present application: "Low Impact Network Debugging" with U.S. application Ser. No. 11/489,926; "Reflecting Bandwidth and Priority in Network Attached Storage I/O" with U.S. application Ser. No. 11/489,936; "Priority and Bandwidth Specification at Mount Time of NAS Device Volume" with U.S. application Ser. No. 11/489,934; "Notifying Network Applications of Receive Overflow Conditions" with U.S. application Ser. No. 11/490,821; "Host Operating System Bypass for Packets Destined for a Virtual Machine" with U.S. application Ser. No. 11/489,943; "Multi-Level Packet Classification" with U.S. application Ser. No. 11/490,745; "Method and System for Automatically Reflecting Hardware Resource Allocation Modifications" with U.S. application Ser. No. 11/490,582; "Multiple Virtual Network Stack Instances Using Virtual Network Interface Cards" with U.S. application Ser. No. 11/489,942; "Method and System for Network Configuration for Containers" with U.S. application Ser. No. 11/490,479; "Network Memory Pools for Packet Destinations and Virtual Machines" with U.S. application Ser. No. 11/490,486; "Method and System for Network Configuration for Virtual Machines" with U.S. application Ser. No. 11/489,923; "Multiple Virtual Network Stack Instances" with U.S. application Ser. No. 11/489,929; and "Shared and Separate Network Stack Instances" with U.S. application Ser. No. 11/489,933.

The present application contains subject matter that may be related to the subject matter in the following U.S. applications filed on Nov. 28, 2006, and assigned to the assignee of the present application: "Virtual Network Testing and Deployment using Network Stack Instances and Containers" with U.S. application Ser. No. 11/605,114 and "Method and System for Creating A Demilitarized Zone using Network Stack Instances" with U.S. application Ser. No. 11/642,427 filed on Dec. 20, 2006.

The present application contains subject matter that may be related to the subject matter in the following U.S. application filed on Dec. 20, 2006, and assigned to the assignee of the present application: "Network Stack Instance Architecture with Selection of Transport Layers" with U.S. application Ser. No. 11/642,490.

BACKGROUND

Network traffic is transmitted over a network, such as the Internet, from a sending computer system, via a first network interface card (NIC), to a receiving computer system via a second NIC. The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically transmitted through one or more connections. The connections may occur on a physical level. For example, the packets may be transmitted as signals (e.g., electrical, optical, etc) between the two systems through a variety of cables, routers, transmitters, receivers, and/or other interconnected hardware. In addition, the connections may occur on a logical level. For example, in order for the sending system and receiving system to communicate with one another, packets must properly reach the receiving system from the sending system. The receiving device must also recognize that the packets received are indeed meant for the receiving device and separate the packets from other incoming signals. Networking protocols dictate the rules for data representation, signaling, transfer, authentication, and error detection required to transmit information between the sending system and receiving system.

The Open Systems Interconnection Reference Model (OSI model) describes seven different layers that define requirements for communications between two computer systems. The OSI model was developed to enable interoperability between platforms offered by various vendors. Each layer of the OSI model performs services for the layer above and requests services from the layer below. In order from lowest to highest, the layers of the OSI model are: (i) the physical layer, which defines the electrical and physical specifications for devices, (ii) the data link layer, which specifies the transfer of data between network entities, (iii) the network layer, which describes the transmission of variable length data sequences from a source to a destination via one or more networks, (iv) the transport layer, which transfers data between end users, (v) the session layer, which opens, maintains, and closes connections between network devices, (vi) the presentation layer, which transforms data into a form usable by an application, and finally, (vii) the application layer, which allows a user to access the information transmitted over the network.

SUMMARY

In general, in one aspect, the invention relates to a method for routing a packet. The method includes receiving the packet in a network interface card (NIC), classifying the packet, placing the packet in a receive ring of the NIC, sending the packet to a virtual NIC associated with the receive ring, sending the packet to a first container associated with the virtual NIC, and routing the packet to a packet destination using the first container.

In general, in one aspect, the invention relates to a system for routing a packet. The system includes a host comprising a first container; and a network interface card (NIC) operatively connected to the host. In one embodiment of the invention, the host is configured to receive the packet in the NIC, classify the packet, place the packet in a receive ring of the NIC, send the packet to a virtual NIC associated with the receive ring, send the packet to the first container associated with the virtual NIC, and route the packet to a packet destination using the first container.

In general, in one aspect, the invention relates to a computer usable medium having computer readable program code embodied therein for causing a computer system to execute a method for configuring a network. The method includes receiving the packet in a network interface card (NIC), classifying the packet, placing the packet in a receive ring of the NIC, sending the packet to a virtual NIC associated with the receive ring, sending the packet to a first container associated with the virtual NIC, and routing the packet to the packet destination using the first container.

Other aspects of the invention will be apparent from the following description and the appended claims.

DETAILED DESCRIPTION

Figure 1:
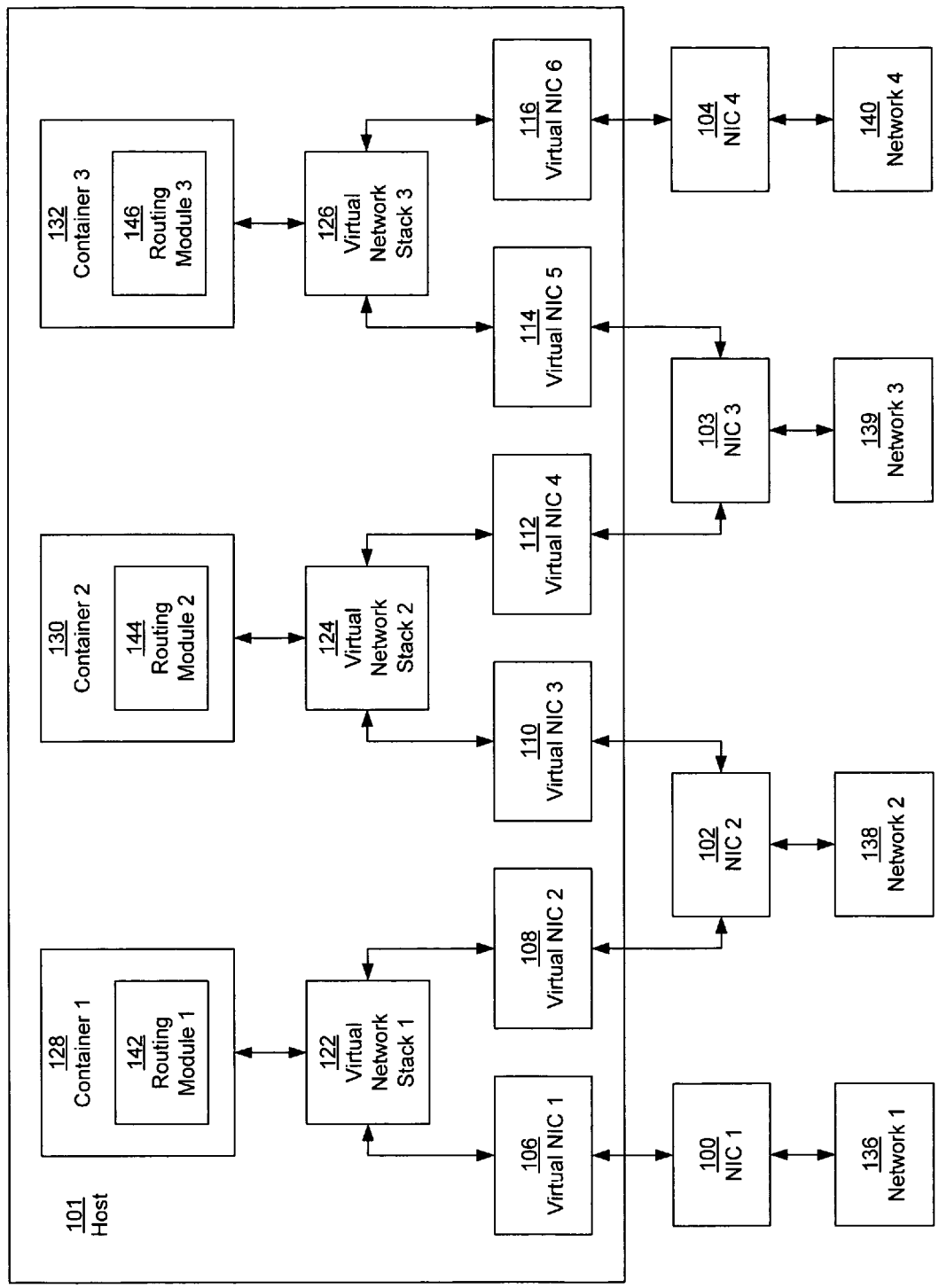
FIGS. 1-3 show schematic diagrams in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to route packets using containers within a host. In one embodiment of the invention, containers correspond to isolated execution environments within the host, which are associated with one or more network interface cards (NICs). In addition, each container is associated with one or more virtual NICs. In one embodiment of the invention, the virtual NICs may implement a Media Access Control (MAC) layer configuration, such as a virtual Local Area Network (VLAN), Virtual Private Network (VPN) tunnel, etc. Embodiments of the invention allow arbitrary network topologies and configurations to exist inside a single host, with dynamic routing of packets within containers.

FIG. 1 shows a schematic diagram of a system in accordance with one or more embodiments of the invention. As shown in FIG. 1, the system includes a host (101), multiple NICs (e.g., NIC 1 (100), NIC 2 (102), NIC 3 (103), NIC 4 (104)) connected to different networks (e.g., network 1 (136), network 2 (138), network 3 (139), network 4 (140)), multiple containers (e.g., container 1 (128), container 2 (130), container 3 (132)), each of which is connected to a virtual network stack (e.g., virtual network stack 1 (122), virtual network stack 2 (124), virtual network stack 3 (126)), which is further connected to a virtual NIC (e.g., virtual NIC 1 (106), virtual NIC 2 (108), virtual NIC 3 (110), virtual NIC 4 (112), virtual NIC 5 (114), virtual NIC 6 (116)), a container management module (not shown), and a virtual switch (350) (shown in FIG. 3) connecting the virtual NICs. Each of these components is described below.

In one embodiment of the invention, each NIC (e.g., NIC 1 (100), NIC 2 (102), NIC 3 (103), NIC 4 (104)) provides an interface between the host (101) and a network (e.g., network 1 (136), network 2 (138), network 3 (139), network 4 (140)) (e.g., a local area network, a wide area network, a wireless network, etc.). More specifically, each of the NICs (e.g., NIC 1 (100), NIC 2 (102), NIC 3 (103), NIC 4 (104)) includes a network interface (NI) (i.e., the hardware on the NIC used to interface with the network) (not shown). For example, the NI may correspond to an RJ-45 connector, a wireless antenna, etc. The packets received by the NI are then forwarded to other components on the NIC (e.g., NIC 1 (100), NIC 2 (102), NIC 3 (103), NIC 4 (104)) for processing. In one embodiment of the invention, each NIC (e.g., NIC 1 (100), NIC 2 (102), NIC 3 (103), NIC 4 (104)) includes one or more receive rings (not shown) and functionality to analyze each packet and determine to which receive ring the packet should be forwarded. In one embodiment of the invention, the receive rings correspond to portions of memory within the NIC (e.g., NIC 1 (100), NIC 2 (102), NIC 3 (103), NIC 4 (104)) used to temporarily store packets received from the network. Further, in one embodiment of the invention, a ring element of the receive rings may point to host memory.

In one or more embodiments of the invention, analyzing individual packets includes determining to which of the receive rings each packet is forwarded. In one embodiment of the invention, analyzing the packets by a classifier (not shown) on each NIC (e.g., NIC 1 (100), NIC 2 (102), NIC 3 (103), NIC 4 (104)) includes analyzing one or more fields in each of the packets to determine to which of the receive rings the packets are forwarded. As an alternative, the classifier may use the contents of one or more fields in each packet as an index into a data structure that includes information necessary to determine to which receive ring that packet is forwarded. The classifiers may be implemented entirely in hardware (i.e., a classifier may be a separate microprocessor embedded on a NIC (e.g., NIC 1 (100), NIC 2 (102), NIC 3 (103), NIC 4 (104))). Alternatively, the classifiers may be implemented in software stored in memory (e.g., firmware, etc.) on the NIC and executed by a microprocessor on the NIC (e.g., NIC 1 (100), NIC 2 (102), NIC 3 (103), NIC 4 (104)).

In one or more embodiments of the invention, the host (101) may include a device driver (not shown) and one or more virtual NICs (e.g., virtual NIC 1 (106), virtual NIC 2 (108), virtual NIC 3 (110), virtual NIC 4 (112), virtual NIC 5 (114), virtual NIC 6 (116)). In one embodiment of the invention, the device driver provides an interface between the receive rings on a NIC (e.g., NIC 1 (100), NIC 2 (102), NIC 3 (103), NIC 4 (104)) and the host (101). More specifically, the device driver exposes the receive rings on the NICs (e.g., NIC 1 (100), NIC 2 (102), NIC 3 (103), NIC 4 (104)) to the host (101). In one embodiment of the invention, each of the virtual NICs (e.g., virtual NIC 1 (106), virtual NIC 2 (108), virtual NIC 3 (110), virtual NIC 4 (112), virtual NIC 5 (114), virtual NIC 6 (116)) is associated with one or more receive rings on a NIC (e.g., NIC 1 (100), NIC 2 (102), NIC 3 (103), NIC 4 (104)). In other words, a virtual NIC (e.g., virtual NIC 1 (106), virtual NIC 2 (108), virtual NIC 3 (110), virtual NIC 4 (112), virtual NIC 5 (114), virtual NIC 6 (116)) receives incoming packets from the corresponding receive ring. In one or more embodiments of the invention, outgoing packets are forwarded from a virtual NIC (e.g., virtual NIC 1 (106), virtual NIC 2 (108), virtual NIC 3 (110), virtual NIC 4 (112), virtual NIC 5 (114), virtual NIC 6 (116)) to a corresponding transmit ring (not shown), which temporarily stores the packet before transmitting the packet over the network. In one or more embodiments of the invention, receive rings and transmit rings are implemented as ring buffers in either software or hardware.

In one or more embodiments of the invention, the virtual NICs (e.g., virtual NIC 1 (106), virtual NIC 2 (108), virtual NIC 3 (110), virtual NIC 4 (112), virtual NIC 5 (114), virtual NIC 6 (116)) are operatively connected to containers (e.g., container 1 (128), container 2 (130), container 3 (132)) via virtual network stacks (e.g., virtual network stack 1 (122), virtual network stack 2 (124), virtual network stack 3 (126)). The virtual NICs (e.g., virtual NIC 1 (106), virtual NIC 2 (108), virtual NIC 3 (110), virtual NIC 4 (112), virtual NIC 5 (114), virtual NIC 6 (116)) provide an abstraction layer between the NICs (e.g., NIC 1 (100), NIC 2 (102), NIC 3 (103), NIC 4 (104)) and the containers (e.g., container 1 (128), container 2 (130), container 3 (132)) on the host (101). More specifically, each virtual NIC (e.g., virtual NIC 1 (106), virtual NIC 2 (108), virtual NIC 3 (110), virtual NIC 4 (112), virtual NIC 5 (114), virtual NIC 6 (116)) operates like a NIC (e.g., NIC 1 (100), NIC 2 (102), NIC 3 (103), NIC 4 (104)). For example, in one or more embodiments of the invention, each virtual NIC (e.g., virtual NIC 1 (106), virtual NIC 2 (108), virtual NIC 3 (110), virtual NIC 4 (112), virtual NIC 5 (114), virtual NIC 6 (116)) is associated with one or more IP addresses one or more MAC addresses. Further, each virtual NIC may be optionally associated with one or more ports, and configured to handle one or more protocol types. As a result, containers (e.g., container 1 (128), container 2 (130), container 3 (132)) on the host (101) are unable to distinguish a virtual NIC (e.g., virtual NIC 1 (106), virtual NIC 2 (108), virtual NIC 3 (110), virtual NIC 4 (112), virtual NIC 5 (114), virtual NIC 6 (116)) from a physical NIC (e.g., NIC 1 (100), NIC 2 (102), NIC 3 (103), NIC 4 (104)).

In one or more embodiments of the invention, the virtual NICs (e.g., virtual NIC 1 (106), virtual NIC 2 (108), virtual NIC 3 (110), virtual NIC 4 (112), virtual NIC 5 (114), virtual NIC 6 (116)) are associated with a MAC layer (not shown), which is responsible for moving data packets between the NIC and virtual NICs, as well as between other NICs on other hosts, using MAC protocols. The MAC layer is also responsible for ensuring that collisions do not occur when signals are sent from multiple devices at the same time. In addition, the virtual NICs (e.g., virtual NIC 1 (106), virtual NIC 2 (108), virtual NIC 3 (110), virtual NIC 4 (112), virtual NIC 5 (114), virtual NIC 6 (116)) may implement a MAC layer configuration, such as a virtual LAN, VPN tunnel, etc.

In one or more embodiments of the invention, each virtual network stack (e.g., virtual network stack 1 (122), virtual network stack 2 (124), virtual network stack 3 (126)) includes functionality to process packets in accordance with various protocols used to send and receive packets (e.g., Transmission Control Protocol (TCP), Internet Protocol (IP), User Datagram Protocol (UDP), etc.). Further, each virtual network stack may also include functionality, as needed, to perform additional processing on the incoming and outgoing packets. This additional processing may include, but is not limited to, cryptographic processing, firewall routing, etc.

In one or more embodiments of the invention, the virtual network stacks (e.g., virtual network stack 1 (122), virtual network stack 2 (124), virtual network stack 3 (126)) correspond to network stacks with network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.). In one or more embodiments of the invention, the virtual network stacks (e.g., virtual network stack 1 (122), virtual network stack 2 (124), virtual network stack 3 (126)) implement an IP layer (not shown) and a TCP layer (not shown).

As shown in FIG. 1, the host (101) includes a global container (not shown) and a number of non-global containers (e.g., container 1 (128), container 2 (130), container 3 (132)). The global container corresponds to an isolated execution environment within the host (101). Further, each non-global container (e.g., container 1 (128), container 2 (130), container 3 (132)) corresponds to an isolated execution environment within the global container. All of the containers (global and non-global) share a common kernel, and as a result, execute the same operating system. While all of the containers share a common kernel, the non-global containers (e.g., container 1 (128), container 2 (130), container 3 (132)) are configured such that processes executing in a given non-global container are restricted to execute in the non-global container and have no access to resources not assigned to the non-global container. The isolated execution environments of each non-global container (e.g., container 1 (128), container 2 (130), container 3 (132)) as well as the global container are managed by a container management component (not shown) executing on the host (101). The container management component typically executes outside of the global container. An example of a container is a Solaris™ Container. (Solaris is a trademark of Sun Microsystems, Inc. of California, USA)

Each of the non-global containers (e.g., container 1 (128), container 2 (130), container 3 (132)) is configured to send and receive packets to and from the NICs (e.g., NIC 1 (100), NIC 2 (102), NIC 3 (103), NIC 4 (104)). The virtual network stacks (e.g., virtual network stack 1 (122), virtual network stack 2 (124), virtual network stack 3 (126)) connected to the non-global containers (e.g., container 1 (128), container 2 (130), container 3 (132)) process outgoing packets before transmitting the packets to other containers or hosts; the virtual network stacks also process incoming packets from other sources before sending the packets to the containers. In one or more embodiments of the invention, each non-global container (e.g., container 1 (128), container 2 (130), container 3 (132)) and the global container (101) are identified by a container ID, which uniquely identifies the container in the host (101).

In addition, each non-global container (e.g., container 1 (128), container 2 (130), container 3 (132)) includes a routing module (e.g., routing module 1 (142), routing module 2 (144), routing module 3 (146)). In one or more embodiments of the invention, the routing modules (e.g., routing module 1 (142), routing module 2 (144), routing module 3 (146)) enable the containers (e.g., container 1 (128), container 2 (130), container 3 (132)) to function as routers. In other words, the routing modules (e.g., routing module 1 (142), routing module 2 (144), routing module 3 (146)) allow containers (e.g., container 1 (128), container 2 (130), container 3 (132)) to perform routing of packets between networks (e.g., network 1 (136), network 2 (138), network 3 (139), network 4 (140)).

In one or more embodiments of the invention, the classifier (not shown) on a NIC (e.g., NIC 1 (100), NIC 2 (102), NIC 3 (103), NIC 4 (104)) uses a set of source and/or destination address ranges to direct uncategorized packets received from a network (e.g., network 1 (136), network 2 (138), network 3 (139), network 4 (140)) to a specific receive ring on the NIC. These packets are then sent to the virtual NIC (e.g., virtual NIC 1 (106), virtual NIC 2 (108), virtual NIC 3 (110), virtual NIC 4 (112), virtual NIC 5 (114), virtual NIC 6 (116)) associated with the receive ring, passed to the virtual network stack (e.g., virtual network stack 1 (122), virtual network stack 2 (124), virtual network stack 3 (126)) connected to the virtual NIC, and sent to the container (e.g., container 1 (128), container 2 (130), container 3 (132)) governing the virtual network stack. The packets may be processed by the virtual network stacks (e.g., virtual network stack 1 (122), virtual network stack 2 (124), virtual network stack 3 (126)) and/or containers (e.g., container 1 (128), container 2 (130), container 3 (132)), then routed by the containers to another network (e.g., network 1 (136), network 2 (138), network 3 (139), network 4 (140)). In one or more embodiments of the invention, the containers (e.g., container 1 (128), container 2 (130), container 3 (132)) use characteristics of the packets and/or of the network configuration in general to route the packets.

The container (e.g., container 1 (128), container 2 (130), container 3 (132)) may choose to implement all of the MAC and IP layer functionalities described with the virtual NICs (e.g., virtual NIC 1 (106), virtual NIC 2 (108), virtual NIC 3 (110), virtual NIC 4 (112), virtual NIC 5 (114), virtual NIC 6 (116)) or with the virtual network stacks (e.g., virtual network stack 1 (122), virtual network stack 2 (124), virtual network stack 3 (126)) on its own. On the other hand, each container (e.g., container 1 (128), container 2 (130), container 3 (132)) may choose to govern its virtual network stack (e.g., virtual network stack 1 (122); virtual network stack 2 (124), virtual network stack 3 (126)), as well as the virtual NICs (e.g., virtual NIC 1 (106), virtual NIC 2 (108), virtual NIC 3 (110), virtual NIC 4 (112), virtual NIC 5 (114), virtual NIC 6 (116)) associated with its virtual network stack, such that the virtual network stack and virtual NICs behave as expected.

In one embodiment of the invention, the routing module (e.g., routing module 1 (142), routing module 2 (144), routing module 3 (146)) of each container (e.g., container 1 (128), container 2 (130), container 3 (132)) may include a routing table (not shown), which stores the best routes to certain network destinations, routing metrics associated with the routes, and the path to the next hop in the route. Alternatively, the routing table may be stored in the virtual network stack (e.g., virtual network stack 1 (122), virtual network stack 2 (124), virtual network stack 3 (126)) associated with the container (e.g., container 1 (128), container 2 (130), container 3 (132)) and used by the routing module (e.g., routing module 1 (142), routing module 2 (144), routing module 3 (146)) from the virtual network stack, or used by the virtual network stack itself. The routing module (e.g., routing module 1 (142), routing module 2 (144), routing module 3 (146)) uses a routing protocol, such as Router Information Protocol (RIP), Open Shortest Path First (OSPF), or Intermediate System to Intermediate System (IS-IS), to communicate with other routing containers (e.g., container 1 (128), container 2 (130), container 3 (132)) and routers. The routing table is then built by the routing module (e.g., routing module 1 (142), routing module 2 (144), routing module 3 (146)) based on the communications with other routing devices. In one or more embodiments of the invention, the routing table also includes hierarchical routing features such as Multiprotocol Label Switching (MLPS), allowing packets to be processed more quickly. In addition, protocols such as MLPS allow the creation of VPNs and traffic engineering policies within the routing module (e.g., routing module 1 (142), routing module 2 (144), routing module 3 (146)).

Continuing with the discussion of FIG. 1, container 1 (128) routes between network 1 (136) and network 2 (138), container 2 routes between network 2 (138) and network 3 (139), and container 3 routes between network 3 (139) and network 4 (140). Those skilled in the art will appreciate that a container (e.g., container 1 (128), container 2 (130), container 3 (132)) may route between more than two networks. For example, a single container (e.g., container 1 (128), container 2 (130), container 3 (132)) may route packets between three or more networks (e.g., network 1 (136), network 2 (138), network 3 (139), network 4 (140)) based on source and destination addresses, protocols, packet headers, etc. In addition, a container (e.g., container 1 (128), container 2 (130), container 3 (132)) may not be directly involved in the routing. Instead, the container may configure the virtual network stack (e.g., virtual network stack 1 (122), virtual network stack 2 (124), virtual network stack 3 (126)) and virtual NICs (e.g., virtual NIC 1 (1106), virtual NIC 2 (108), virtual NIC 3 (110), virtual NIC 4 (112), virtual NIC 5 (114), virtual NIC 6 (116)) to perform the routing. Packets arriving at a virtual network stack (e.g., virtual network stack 1 (122), virtual network stack 2 (124), virtual network stack 3 (126)) may never enter the container (e.g., container 1 (128), container 2 (130), container 3 (132)) attached to the virtual network stack. Instead, the container (e.g., container 1 (128), container 2 (130), container 3 (132)) relays routing policies to the virtual network stack (e.g., virtual network stack 1 (122), virtual network stack 2 (124), virtual network stack 3 (126)), virtual NICs (e.g., virtual NIC 1 (106), virtual NIC 2 (108), virtual NIC 3 (110), virtual NIC 4 (112), virtual NIC 5 (114), virtual NIC 6 (116)), and/or the NICs (e.g., NIC 1 (100), NIC 2 (102), NIC 3 (103), NIC 4 (104)), which implement the routing by processing and directing packets.

The following is an example of one or more embodiments of the invention and is not intended to limit the scope of the invention. Turning to the example, assume that a packet from network 2 (138) is received by NIC 2 (102). Based on the contents of the packet, the classifier of NIC 2 (102) may place the packet in a receive ring corresponding to virtual NIC 2 (108) or virtual NIC 3 (110). As stated above, the classifier may use criteria found in the packet, such as source address, destination address, source or destination port, protocol, etc. to place the packet in an appropriate receive ring. The packet is then sent to virtual NIC 2 (108) or virtual NIC 3 (110), depending on the receive ring in which the packet is placed. The virtual NIC (108 or 110) may then apply MAC layer processing, such as adding or removing a VLAN tag, to the packet, before sending the packet to the virtual network stack (virtual network stack 1 (122) or virtual network stack 2 (124)) connected to the virtual NIC. In one or more embodiments of the invention, the MAC layer processing applied to the packet is based on the MAC layer configuration of the virtual NIC (108 or 110). The virtual network stack (virtual network stack 1 (122) or virtual network stack 2 (124)) may also process the packet (e.g., authenticating the packet, encrypting/decrypting the packet, network address translation (NAT), etc.) before sending the packet to the container (container 1 (128) or container 2 (130)) corresponding to the virtual network stack.

Once the packet arrives at the container (container 1 (128) or container 2 (130)), the container may process the packet further before sending the packet back to the virtual network stack (virtual network stack 1 (122) or virtual network stack 2 (124)). Based on the contents of the packet, which may have been altered on its way up to the container (container 1 (128) or container 2 (130)), the virtual network stack (virtual network stack 1 (122) or virtual network stack 2 (124)) sends the packet to a particular virtual NIC. In the case of virtual network stack 1 (122), the packet may be sent to virtual NIC 1 (106) or virtual NIC 2 (108) depending on the packet's contents, source, and destination. Similarly, virtual network stack 2 (124) may send the packet to virtual NIC 3 (110) or virtual NIC 4 (112). For example, if a packet from network 1 (136) is received by virtual NIC 1 (106) and sent up virtual network stack 1 (122), then container 1 (128) may route the packet to network 2 (138) by sending the packet back down virtual network stack 1 (122) to virtual NIC 2 (108), where the packet is relayed to NIC 2 (102) and transmitted over network 2 (138).

Alternatively, a packet from network 2 (138) may be destined for network 3 (139) or network 1 (136). Based on the destination address in the packet, the classifier in NIC 2 (102) places the packet in the receive ring corresponding to the virtual NIC (virtual NIC 2 (108) or virtual NIC 3 (110)) that is associated with the packet's destination address. The packet is then routed to the destination network (network 1 (136) or network 3 (139)) by proceeding up the virtual network stack (virtual network stack 1 (122) or virtual network stack 2 (124)) connected to the virtual NIC (virtual NIC 2 (108) or virtual NIC 3 (110)), then back down the virtual network stack and to the other virtual NIC (virtual NIC 1 (106) or virtual NIC 4 (112)) and NIC (NIC 1 (100) or NIC 3 (103)) corresponding to the destination network.

Figure 2:
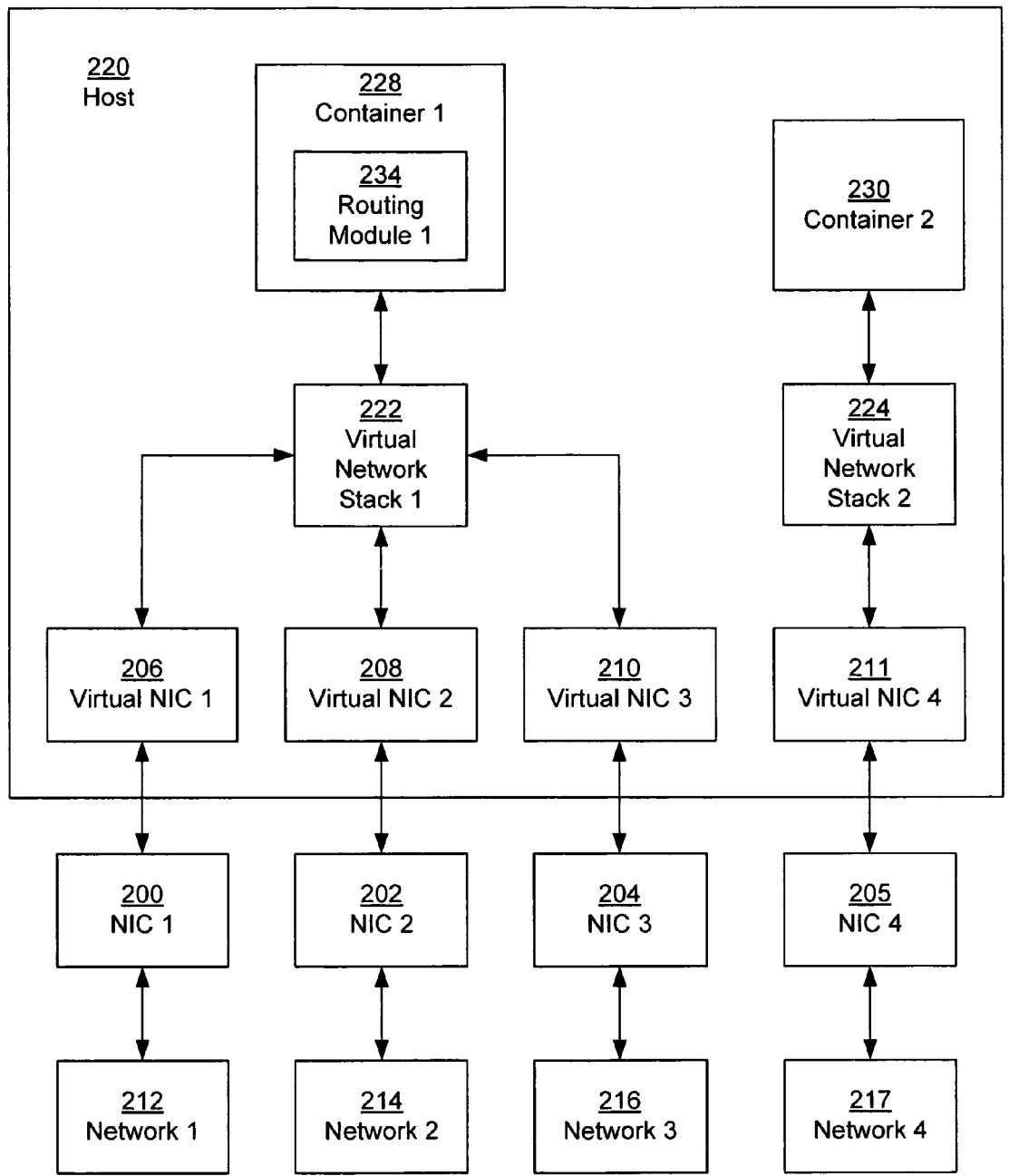

FIG. 2 shows a schematic diagram of a system in accordance with one or more embodiments of the invention. Specifically, FIG. 2 shows a host (220) with two containers (e.g., container 1 (228), container 2 (230)). Container 1 (228) includes functionality to route packets between three networks (e.g., network 1 (212), network 2 (214), network 3 (216)). Each network is associated with a particular NIC (e.g., NIC 1 (200), NIC 2 (202), NIC 3 (204)), which is further associated with a virtual NIC (e.g., virtual NIC 1 (206), virtual NIC 2 (208), virtual NIC 3 (210)). The routing module (234) allows container 1 (228) to direct packets from each of the three networks (e.g., network 1 (212), network 2 (214), network 3 (216)) to another of the three networks. Alternatively, the routing module (234) may simply administers routing policies to virtual network stack 1 (222), and possibly one or more of the virtual NICs (e.g., virtual NIC 1 (206), virtual NIC 2 (208), virtual NIC 3 (210)), which implement the routing of packets from one network (e.g., network 1 (212), network 2 (214), network 3 (216)) to another. One or more of the virtual NICs (e.g., virtual NIC 1 (206), virtual NIC 2 (208), virtual NIC 3 (210)) may also implement a MAC layer configuration, such as a VLAN or VPN tunnel.

The following is an example of one or more embodiments of the invention and is not intended to limit the scope of the invention. Turning to the example, if network 1 (212) is associated with IP address 10.1.51.0, network 2 (214) is associated with the IP address of 10.1.52.0, network 3 (216) is associated with the IP address of 10.1.53.0, and the subnet mask contains a value of 255.255.255.0, then a packet from network 1 (212) with a destination address of 10.1.53.1 will be routed to network 3 (216) by container 1 (228) and/or virtual network stack 1 (222). Similarly, a packet from network 2 (214) with a destination IP address of 10.1.51.3 will be routed to network 1 (212).

In contrast, container 2 (230) does not perform routing on incoming or outgoing packets because container 2 (230) is connected to virtual network stack 2 (224), which is only connected to virtual NIC 4 (211) and NIC 4 (205), container 2 (230) is only accessible by one network (i.e., network 4 (217)). As a result, while container 2 (230) may process packets and provide services, such as email or database lookup, container 2 (230) does not function as a router. In addition, container 1 (228) and container 2 (230) operate independently from one another. Accordingly, container 1 (228) does not receive the same traffic as container 2 (230), perform the same functions as container 2 (230), or even acknowledge the existence of container 2 (230). Consequently, containers (e.g., container 1 (228), container 2 (230)) on the host (220) provide separate paths for different types of network traffic, ensure that the traffic is routed correctly and ensure that the data paths do not overlap. In addition, a host (220) may include one or more routing containers (e.g., container 1 (228)) and one or more non-routing containers (e.g., container 2 (230)), as needed, such that all network traffic received by the host is processed and routed appropriately and independently.

Figure 3:
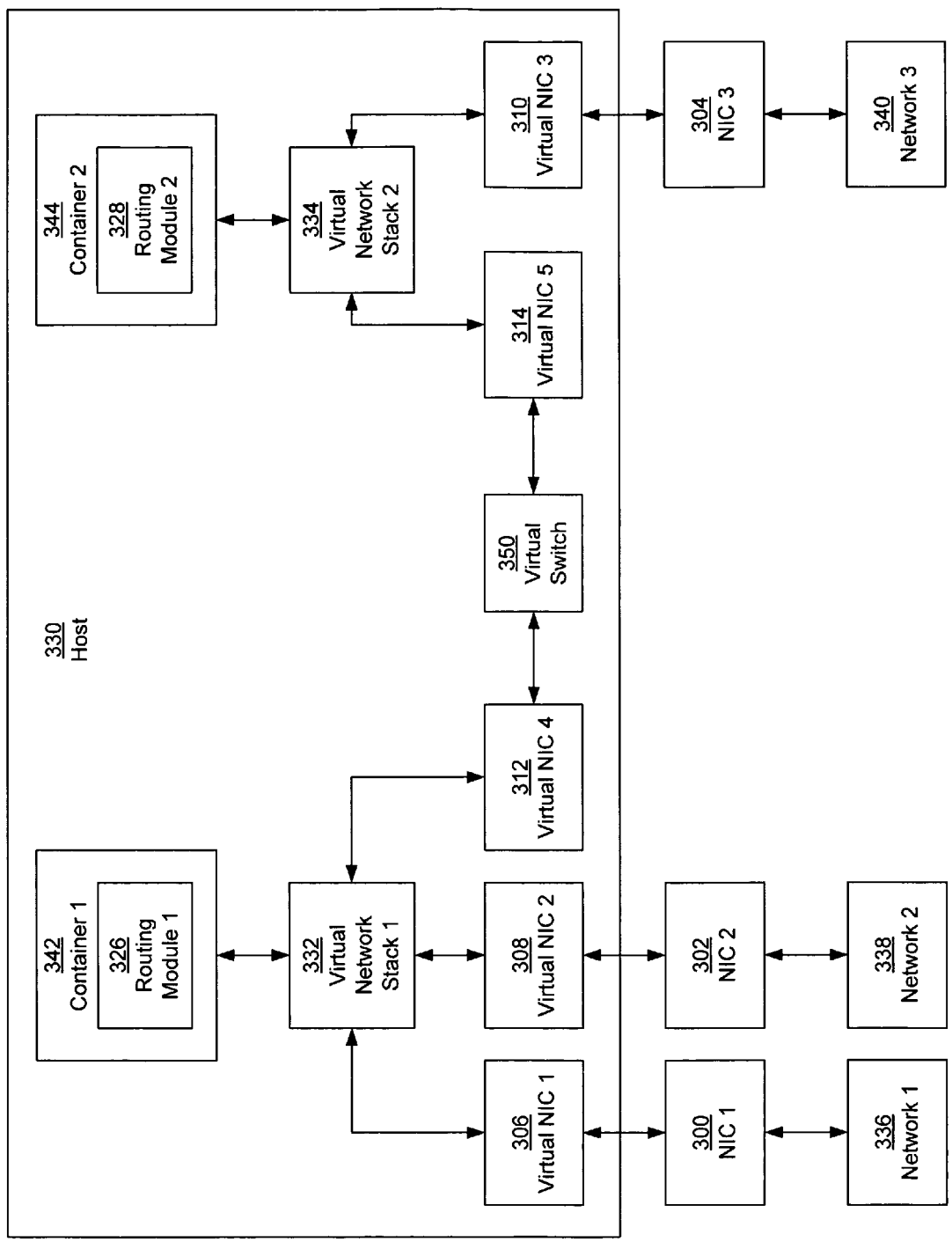

FIG. 3 shows a schematic diagram of a system in accordance with one or more embodiments of the invention. The system of FIG. 3 shows another host (330) with two routing containers (i.e., container 1 (342), container 2 (344)). Container 1 (342) is associated with virtual network stack 1 (332), as well as three virtual NICs (virtual NIC 1 (306), virtual NIC 2 (308), virtual NIC 4 (312)). Virtual NIC 1 (306) is connected to NIC 1 (300), which is in turn connected to network 1 (336). Virtual NIC 2 (308) is associated with to NIC 2 (302), which is linked to network 2 (338). As a result, container 1 (342) may route packets between network 1 (336) and network 2 (338). Container 2 (344) is connected to virtual network stack 2 (334) and two virtual NICs (e.g., virtual NIC 3 (310), virtual NIC 5 (314)). Virtual NIC 3 leads to NIC 3 (304) and network 3 (340).

In addition, container 1 (342) and container 2 (344) are linked through a virtual switch (350) via virtual NIC 4 (312) and virtual NIC 5 (314). In one or more embodiments of the invention, the virtual switch (350) functions as a software equivalent of a network switch. In other words, the virtual switch (350) performs transparent bridging of network segments (i.e., virtual network stacks) within the host (330). For example, virtual network stack 1 (332) may transmit packets to and receive packets from virtual network stack 2 (334) by using the virtual switch (350) and related virtual NICs (e.g., virtual NIC 4 (312), virtual NIC 5 (314)). In one or more embodiments of the invention, all virtual network stacks (e.g., virtual network stack 1 (332), virtual network stack 2 (334)) connected to a virtual switch (350) are registered in the virtual switch's address table (not shown). The virtual switch (350) routes packets to their destinations using the address table. When a packet is received by the virtual switch (350), the destination address is checked against the entries in the address table. If a match is found, the packet is forwarded directly to the virtual NIC (e.g., virtual NIC 1 (306), virtual NIC 2 (308), virtual NIC 3 (310)) associated with the match, which then forwards the packet to the corresponding virtual network stack (e.g., virtual network stack 1 (332), virtual network stack 2 (334)) or to the network (e.g., network 1 (336), network 2 (338), network 3 (340)). If a match is not found, the packet is dropped. In one embodiment of the invention, the virtual switch corresponds to the virtual switch disclosed in the co-pending patent application entitled "Virtual Switch" (application Ser. No. 11/480,261) and assigned to assignee of the present application. The aforementioned patent application is hereby incorporated by reference.

In one or more embodiments of the invention, a routing container (e.g., container 1 (342), container 2 (344)) may route packets between the networks (e.g., network 1 (336), network 2 (338), network 3 (340)) the container is directly connected to, as well as other networks indirectly linked to the container using a virtual switch (350). In one or more embodiments of the invention, connecting the two containers (i.e., container 1 (342) and container 2 (344)) using the virtual switch (350) creates an internal virtual network. Accordingly, container 2 (344) may route packets between the internal virtual network and network 3 (340). Container 1 (342) may route packets between network 1 (336) and network 2 (338), as well as between network 1 (336) and the internal virtual network or between network 2 (338) and the internal virtual network. Further, packets sent to network 1 (336) or network 2 (338) from network 3 (340) may be transmitted to the internal virtual network from network 3 (340), where the packets are routed to virtual network stack 1 (332) and onto the destination network (e.g., network 1 (336), network 2 (338)). Similarly, packets sent from network 1 (336) or network 2 (338) to network 3 (340) may be sent to the internal virtual network and then routed by the virtual switch (350) to virtual network stack 2 (334) and further to network 3 (340).

The following is an example of one or more embodiments of the invention and is not intended to limit the scope of the invention. Turning to the example, if a packet from network 1 (336) bound for network 3 (340) arrives at NIC 1 (300), the packet is transferred to virtual NIC 1 (306). Upon arrival at virtual NIC 1 (306), virtual NIC 1 (306) applies MAC layer processing based on the MAC layer configuration of virtual NIC 1 (306), as required, to the packet and then sends the packet to virtual network stack 1 (332). If the routing is implemented in virtual network stack 1 (332), the packet is sent to virtual NIC 4 (312), which transfers the packet to the virtual switch (350). Alternatively, if routing is implemented in container 1 (342), the packet is sent to container 1 (342) for any additional processing, then returned to virtual network stack 1 (332), which subsequently sends the packet to virtual NIC 4 (312). Virtual NIC 4 (312) subsequently sends the packet to virtual switch (350). Upon receipt of the packet, the virtual switch (350) sends the packet to virtual NIC 5 (314) by matching the address in the packet header with an entry in its address table. Virtual NIC 5 (314) then sends the packet to virtual network stack 2 (334) and/or container 2 (344), possibly for further processing, before container 2 (344) and/or virtual network stack 2 (334) sends the packet down to virtual NIC 3 (310) to network 3 (340).

In one or more embodiments of the invention, the system of FIG. 3 serves to separate an internal network and an external network. The following is an example in accordance with one or more embodiments of the invention and is not intended to limit the scope of the invention. Turning to the example assume that network 3 (340) is an external network and network 1 (336) and network 2 (338) are two sub-networks of an internal network. In order to separate traffic between the external network and internal networks, container 1 (342) is used for the internal networks and container 2 (344) is used for the external networks. Traffic from the external network to the internal networks must be permitted through virtual network stack 2 (334) in order to reach the virtual switch (350) and the other virtual NICs (308, 306). Similarly, traffic from the internal networks must be directed by virtual network stack 1 (332) to the virtual switch (350) before the traffic reaches the external network (e.g., network 3 (340)).

Figure 4:
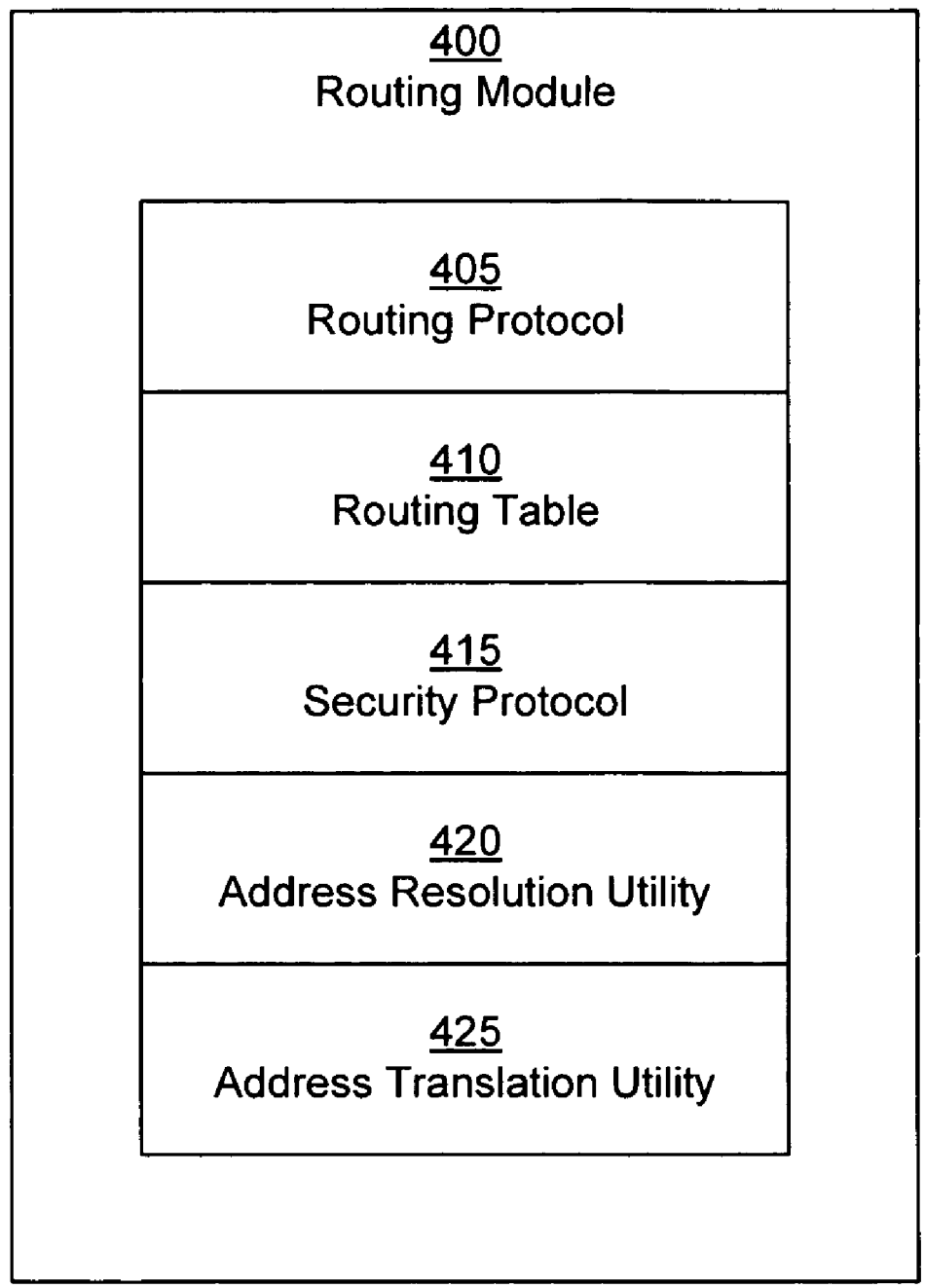
FIG. 4 shows a routing module in accordance with one or more embodiments of the invention.

FIG. 4 shows a routing module in accordance with one or more embodiments of the invention. As shown in FIG. 4, the routing module (400) includes a routing protocol (405), a routing table (410), a security protocol (415), an address resolution utility (420), and an address translation utility (425). In one or more embodiments of the invention, each of these components may be implemented within a container, or by the virtual network stack and/or virtual NIC associated with the container. Further, each routing module (400) may include all of or only a subset of the components shown in FIG. 4. The aforementioned components are described in detail below.

In one embodiment of the invention, the routing table (410) is used to direct outgoing packets by matching destination addresses of the packets to the network paths used to reach them. In one or more embodiments of the invention, the routing table (410) lists the next hop to a destination. As mentioned previously, the routing table (410) may also implement a hierarchical routing architecture, such as MPLS, such that a single table entry can effectively select the next several hops and reduce table lookups, or so that a VPN may be implemented.

In one or more embodiments of the invention, a routing table (410) is created using the routing protocol (405). The routing protocol (405) determines the next hop in the network path using a shortest path algorithm, such as Dijkstra's algorithm, and fills in the routing table (410) with the next hop for any given destination address. Routing protocols include, but are not limited to, Open Shortest Path First (OSPF), Routing Information Protocol (RIP), and Intermediate System to Intermediate System (IS-IS). Different routing protocols (405) may used based on the type of network the packets are transmitted over. In addition, each routing protocol may use routing metrics, such as bandwidth, delay, hop count, path cost, load, Maximum Transmission Unit (MTU), reliability, and communication costs, to determine along which route to send packets.

In one embodiment of the invention, the security protocol (415) secures network data by providing encryption and/or authentication of packets. In addition, the security protocol (415) may be used to create a VPN. An example of a security protocol (415) is IPsec. IPsec provides secure packet flows by the use of authentication headers (AH) in packets, as well as cryptographic protocols for data confidentiality in its encapsulating security payload (ESP). Other security protocols (415) include Secure Sockets Layer (SSL) and Transport Layer Security (TLS).

In one embodiment of the invention, an address resolution utility (420) is used by the routing module (400) to determine a host's hardware address from a network address, or vice versa. Examples of address resolution utilities include Address Resolution Protocol (ARP) and Inverse ARP. For example, the address resolution utility (420) may be used if one host sends a packet to another host, and knows the IP address but not the MAC address of the other host. In such cases, an ARP request is broadcast by the first host and received by the second host, which replies with the missing information. The address resolution utility (420) may also be used if the MAC address of the other host is known, but not the IP address.

In one embodiment of the invention, the address translation utility (425) rewrites the source and/or destination addresses of packets as they pass through the routing module (400) or the virtual network stack implementing the address translation. In one or more embodiments of the invention, address translation allows multiple hosts on a private network to access other networks, such as the Internet, using a single IP address. For example, if the routing module (400) is responsible for routing traffic between two networks, outgoing packets from the first network may have their source IP addresses rewritten to a specific value by the address translation utility (425) before being sent to the second network. The address translation utility (425) may also provide a firewall for a network by preventing hosts outside the network from reaching devices within the network.

Figure 5:
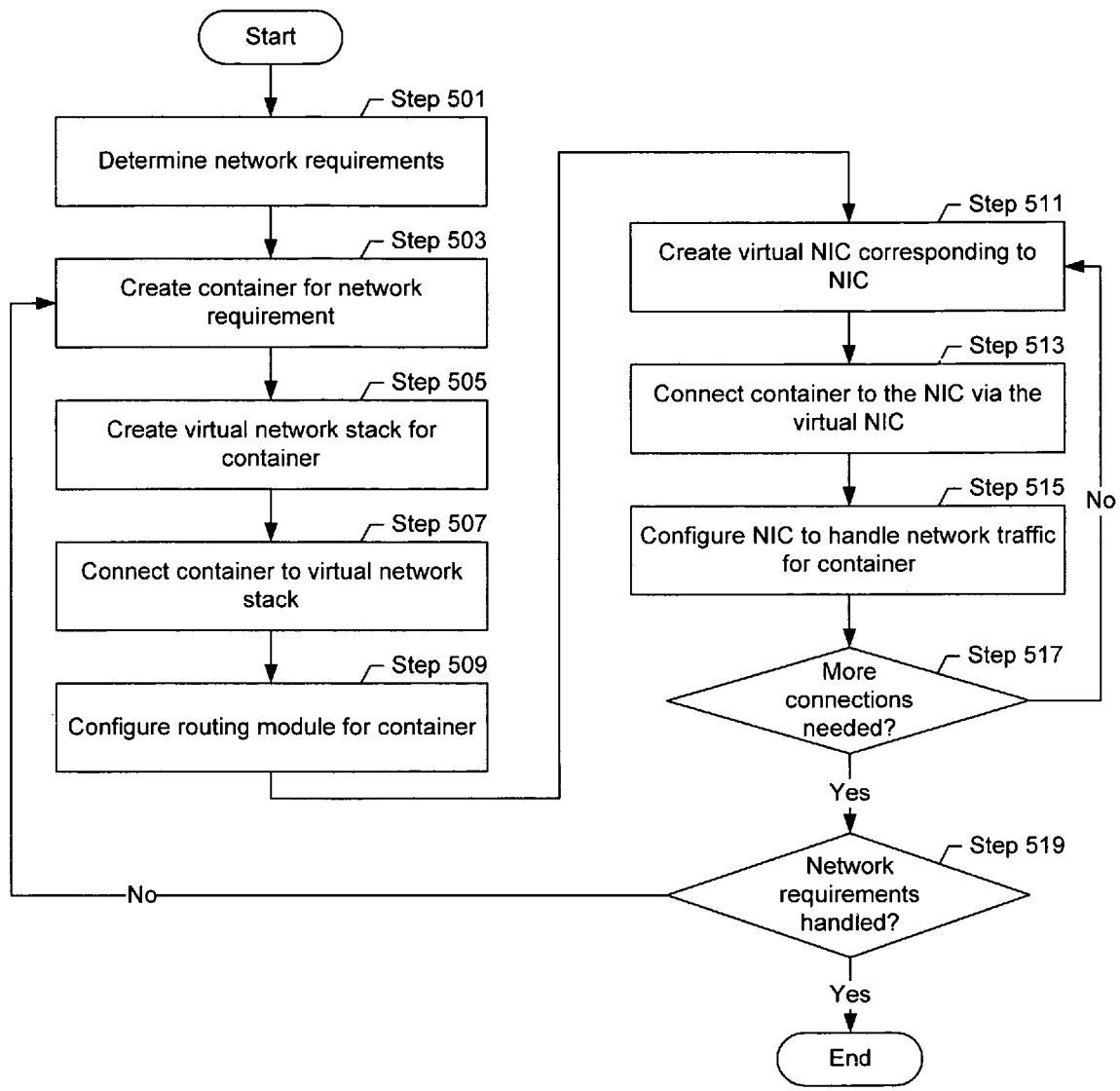
FIGS. 5-6 show flow diagrams in accordance with one or more embodiments of the invention.

FIG. 5 shows a flow diagram of a system setup in accordance with one or more embodiments of the invention. First, the network requirements are determined (Step 501). The network requirements may include network services (e.g., web, email, database, file transfer, etc.), routing capabilities between multiple networks, firewalls, VPNs, VLANs, etc. Next, a container is created to handle a network requirement (Step 503). In one or more embodiments of the invention, multiple network requirements may be satisfied with one container, or more containers. For example, a single container may include functionality to route packets and serve as a firewall. Alternatively, multiple containers may be required to implement a demilitarized zone (DMZ).

Once the container(s) is created, a virtual network stack is created for the container (Step 505) and connected to the container (Step 507). As stated above, the virtual network stack is responsible for handling and processing packets at the transport and network layers. Next, the routing module for the container is configured (Step 509). Configuring the routing module may include specifying the routing protocol, creating the routing table from the routing protocol, setting up a security protocol, enabling address resolution and translation, etc. The steps of configuring the routing module may be performed by an administrator, or may be automatically completed by processes running on the host. Those skilled in the art will appreciate that basic routing configuration steps may be automated, with customization steps performed manually by an administrator if needed.

A virtual NIC corresponding to a NIC is then created (Step 511). In one or more embodiments of the invention, each receive ring on the NIC corresponds to a virtual network, such as a VLAN. The virtual NIC is then associated with one or more of the receive rings on the NIC. As a result, packets from that VLAN are separated at the NIC level and remain separated, while in the host, from packets from other VLANs connected to the NIC. Alternatively, each receive ring on the NIC is simply associated with a set of addresses (e.g., IP addresses, MAC addresses, etc.). Consequently, a virtual NIC connected to a specific receive ring may only receive packets for the set of addresses associated with the receive ring. Packets sent from the virtual NIC to the NIC are correspondingly placed in one or more transmits rings within the NIC.

Once the virtual NIC is created, the container is connected to the virtual NIC (Step 513). The NIC is then configured to handle network traffic for the container (Step 515). For example, the classifier on the NIC is programmed to place packets with certain characteristics, such as source address, destination address, protocol, etc. in the receive ring associated with the virtual NIC.

When the container is connected to the network through the virtual network stack, virtual NIC, and NIC, a determination is made about whether additional connections are needed (Step 517).

Once all components related to one container are created, a determination is made about whether all network requirements are handled (Step 519). If so, the setup is complete. If not, (Steps 503-519) are repeated until all network requirements are fulfilled.

Figure 6:
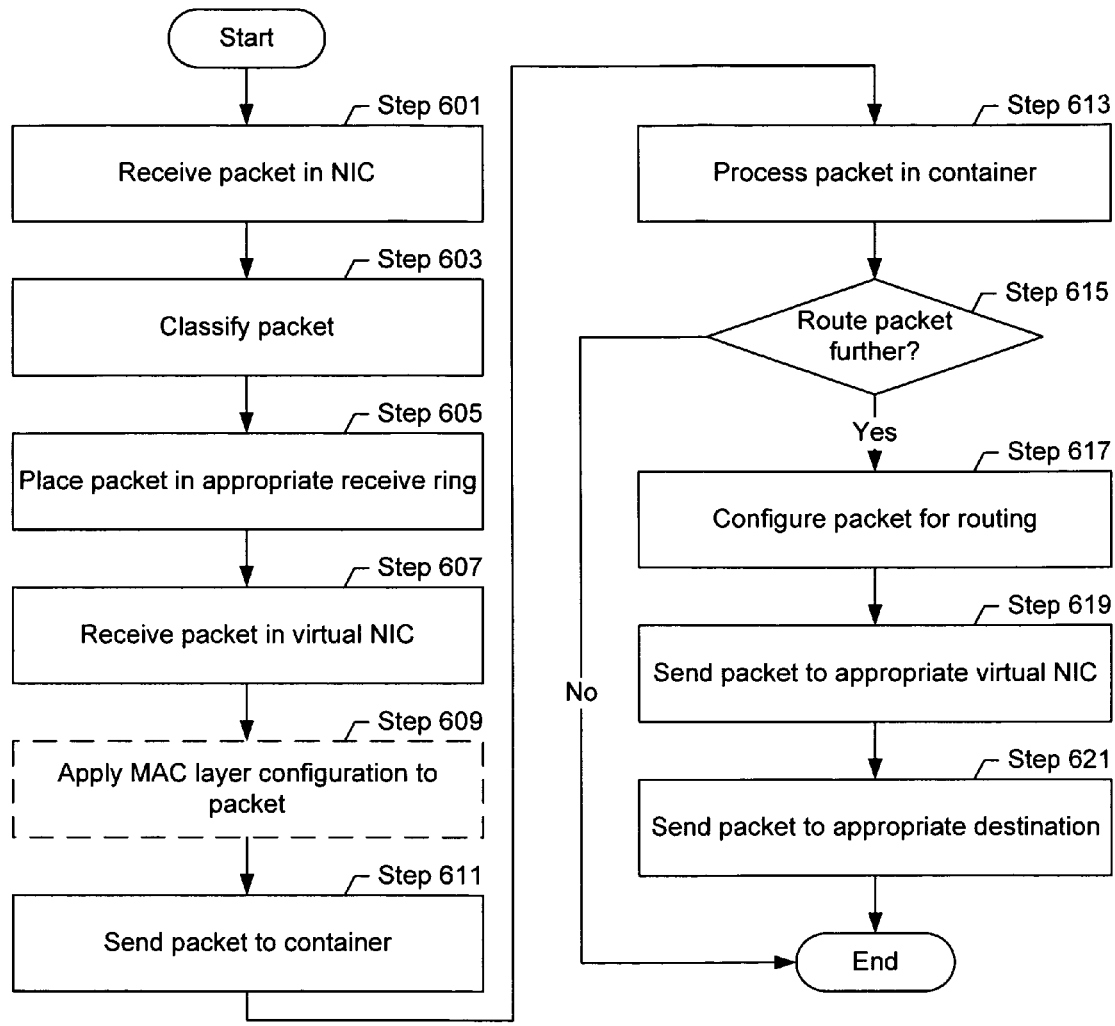

FIG. 6 shows a flow diagram of packet routing in accordance with one or more embodiments of the invention. Initially, the packet is received in a NIC (Step 601). The packet is then classified (Step 603) by the classifier on the NIC and placed in the appropriate receive ring (Step 605) of the NIC. As described above, the classifier may use one or more fields in the packet header, or even the packet contents, to classify the packet. In one or more embodiments of the invention, if the packet cannot be classified into a specific receive ring, the classifier places the packet into a default receive ring on the NIC, which is connected to a routing container. The routing container is then able to direct the packet in the appropriate direction upon receiving the packet.

From the receive ring, the packet is sent to the virtual NIC (Step 607) connected to the receive ring. The virtual NIC may then apply MAC layer processing to the packet (Step 609) if necessary. As mentioned above, the MAC layer processing may be based on the MAC layer configuration of the virtual NIC. MAC layer configurations may include VPN tunnel functionalities, VLAN tags, etc. The packet is then sent to the container (Step 611), where the packet is processed (Step 613). As mentioned previously, the packet may alternatively be processed by the virtual network stack associated with the container, if routing capabilities are implemented in the virtual network stack and configured by the container.

Once in the container or virtual network stack, the packet may be processed by applying network address translation (NAT), encryption/decryption, authentication, etc. In addition, the source and destination addresses of the packet are examined to determine if the packet needs to be routed further (Step 615). For example, if the packet is destined for the container, the packet does not need to be routed further.

However, if the container functions as a router for the packet, the packet will need to be configured for routing (Step 617) by making address changes, adding and removing headers, such as in MPLS, and/or applying any cryptographic or authentication algorithms to the packet contents. The packet is then sent through the virtual network stack to the appropriate virtual NIC (Step 619), where the packet is relayed to its destination (Step 621). As stated above, each virtual NIC corresponds to a particular network connected to the NIC. Sending the packet to a virtual NIC ensures that the packet will be sent out on the network associated with the virtual NIC. In addition, the packet may be sent from the virtual NIC through a virtual switch to another virtual NIC, where the packet is sent out on another network. The first virtual NIC and virtual switch correctly send the packet to the second virtual NIC based on the contents of the packet and the address table of the virtual switch.

Figure 7:
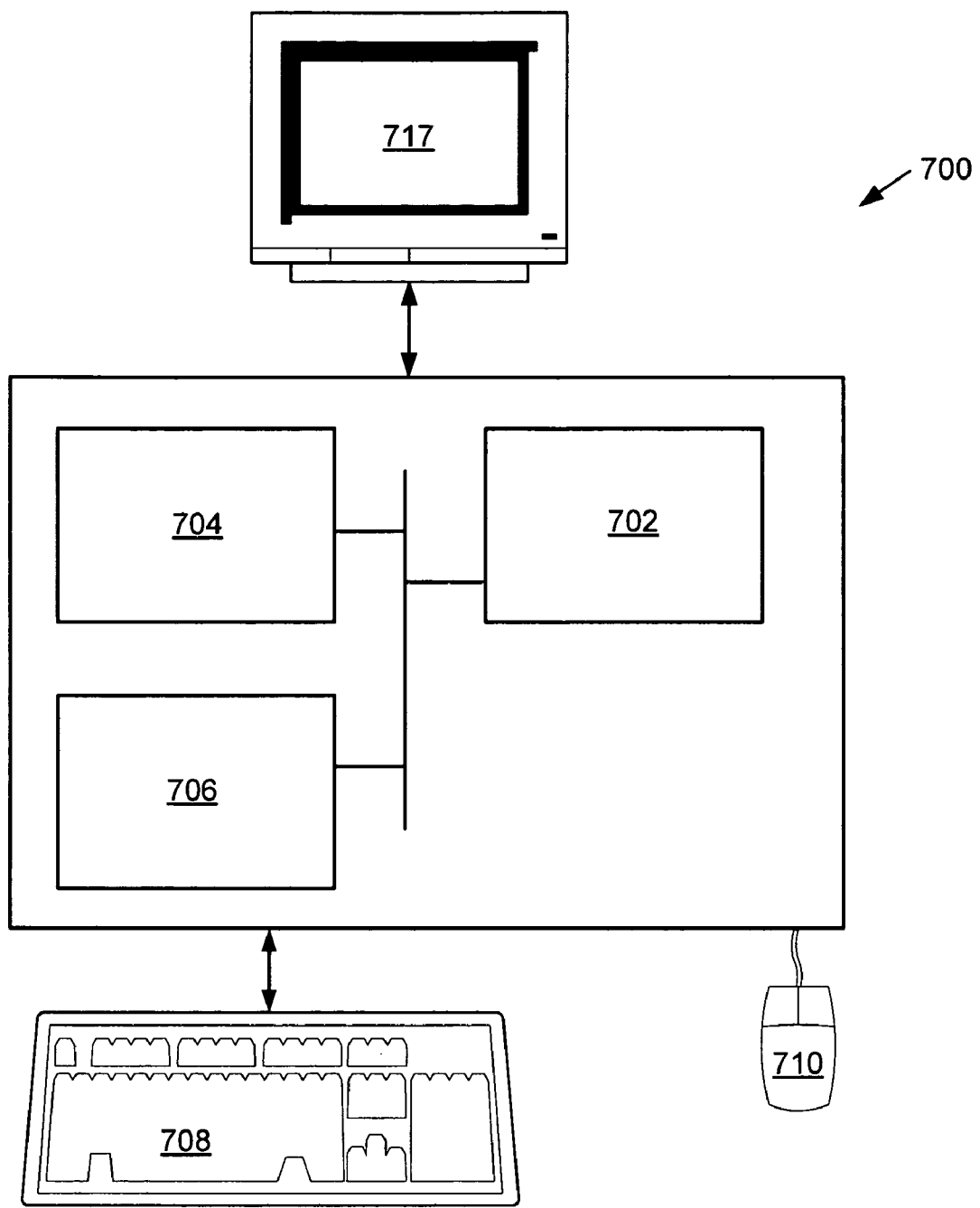
FIG. 7 shows a computer system in accordance with one or more embodiments of the invention.

The invention may be implemented on virtually any type of computer regardless of the platform being used. For example, as shown in FIG. 7, a computer system (700) includes a processor (702), associated memory (704), a storage device (706), and numerous other elements and functionalities typical of today's computers (not shown). The computer (700) may also include input means, such as a keyboard (708) and a mouse (710), and output means, such as a monitor (712). The computer system (700) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (700) may be located at a remote location and connected to the other elements over a network. Further, the invention may be implemented on a distributed system having a plurality of nodes, where each portion of the invention (e.g., virtual NIC, virtual network stack, container, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for routing a packet, comprising:
    receiving the packet in a network interface card (NIC) from a first network;
    classifying the packet on the NIC to identify a receive ring located on the NIC to forward the packet;
    placing the packet in the receive ring;
    sending the packet to a first virtual NIC of a plurality of virtual NICs based on the first virtual NIC corresponding to the receive ring, wherein the plurality of virtual NICs execute on a host connected to the NIC, wherein each of the plurality of virtual NICs is connected to one of a plurality of containers, wherein each of the plurality of containers corresponds to an isolated execution environment, wherein processes within one of plurality of containers are isolated from processes in the other plurality of containers, and wherein the plurality of containers execute a same shared single instance of an operating system;
    sending the packet to a first container of the plurality of containers based on the first container corresponding to the first virtual NIC via a first virtual network stack; and
    routing the packet, by a routing module in the first virtual container, to a packet destination,
        wherein routing the packet comprises:
        identifying a next hop for the packet based on the packet destination;
        forwarding the packet to the next hop on a second network, wherein the packet is forwarded via the first virtual network stack.

2. The method of claim 1, wherein the receive ring is a default receive ring of the NIC.

3. The method of claim 1, wherein the second network is an internal virtual network on the host, wherein the first container is operatively connected to a second container of the plurality of containers using a virtual switch, wherein the second container is connected to the internal virtual network, and wherein the next hop is the second container.

4. The method of claim 1,
    wherein the routing module in the first container comprises a routing protocol, a routing table, a security protocol, an address resolution utility, and an address translation utility,
    wherein the routing table match packet destinations to network paths,
    wherein the routing protocol is configured to determine, based on an algorithm, a next hop for each network path stores in the routing table,
    wherein the security protocol is configured to authenticate and encrypt packets,
    wherein the address resolution utility is configured to identify a hardware address from a network address, and
    wherein the address translation utility is configured to modify a network address of the packet, wherein the network address is at least one selected from a group consisting of a source address of a source of the packet and a destination address of the packet destination.

5. The method of claim 1, wherein a routing module in a second virtual container of the plurality of containers is configured to route packets between the second network and a third network.

6. The method of claim 1, wherein the first container is connected via the first virtual network stack to the first virtual NIC and a second virtual NIC, and wherein the first virtual NIC is connected to the first network and the second virtual NIC is connected to the second network.

7. The method of claim 1, wherein the receive ring is implemented as a ring buffer.

8. The method of claim 1, wherein the NIC comprises a plurality of receive rings for a plurality of virtual NICs executing on the host, wherein each virtual NIC has a corresponding receive ring of the plurality of receive rings on the NIC.

9. The method of claim 1, wherein the first virtual network stack implements transmission control protocol and internet protocol processing.

10. A system for routing a packet, comprising:
a network interface card (NIC) comprising a receive ring, and wherein the NIC is configured to:
receive the packet from a first network;
classify the packet to identify the receive ring to forward the packet;
place the packet in the receive ring;
send the packet to a virtual NIC of a plurality of virtual NICS based on the virtual NIC corresponding to the receive ring; and
a host operatively connected to the NIC, the host comprising the plurality of virtual NICs and a plurality of containers,
wherein each of the plurality of virtual NICs is connected to one of a plurality of containers,
wherein each of the plurality of containers corresponds to an isolated execution environment,
wherein processes within one of plurality of containers are isolated from processes in the other plurality of containers,
wherein the plurality of containers execute a same shared single instance of an operating system, and
wherein a first container of the plurality of containers comprises a routing module, and
wherein the host is configured to:
receive, by the virtual NIC, the packet from the NIC;
send the packet to the first container corresponding to the virtual NIC via a virtual network stack; and
route the packet, by the routing module in the first virtual container, to a packet destination, wherein routing the packet comprises:
identifying a next hop for the packet based on the packet destination;
forwarding the packet to the next hop on a second network, wherein the packet is forwarded via the first virtual network stack.

11. The system of claim 10, wherein the second network is an internal virtual network on the host, wherein the host further comprises:
a virtual switch connecting the first container to a second container of the plurality of containers, wherein the second container is connected to the internal virtual network, and wherein the next hop is the second container.

12. The system of claim 11, wherein the receive ring is a default receive ring of the NIC.

13. The system of claim 11, wherein the routing module comprises a routing protocol, a routing table, a security protocol, an address resolution utility, and an address translation utility,
wherein the routing table match packet destinations to network paths,
wherein the routing protocol is configured to determine, based on an algorithm, a next hop for each network path stored in the routing table,
wherein the security protocol is configured to authenticate and encrypt packets,
wherein the address resolution utility is configured to identify a hardware address from a network address, and
wherein the address translation utility is configured to modify a network address of the packet, wherein the network address is at least one selected from a group consisting of a source address of a source of the packet and a destination address of the packet destination.

14. A computer readable medium having computer executable program code embodied therein for causing a computer system to execute a method, the method comprising:
receiving, by a virtual network interface card (NIC) of a plurality of virtual NICs executing on the computer system, a packet from a receive ring located on a NIC,
wherein each of the plurality of virtual NICs is connected to one of a plurality of containers,
wherein each of the plurality of containers corresponds to an isolated execution environment,
wherein processes within one of plurality of containers are isolated from processes in the other plurality of containers, and
wherein the plurality of containers execute a same shared single instance of an operating system;
sending the packet to a first container of the plurality of containers based on the first container corresponding to the virtual NIC; and
routing the packet, by a routing module in the first virtual container, to the packet destination, wherein routing the packet comprises:
identifying a next hop for the packet based on the packet destination;
forwarding the packet to the next hop on a second network, wherein the packet is forwarded via the first virtual network stack.

15. The computer readable medium of claim 14, wherein the receive ring is a default receive ring of the NIC.

16. The computer readable medium of claim 14, wherein the second network is an internal virtual network on the host, wherein the first container is operatively connected to a second container of the plurality of containers using a virtual switch, wherein the second container is connected to the internal virtual network, and wherein the next hop is the second container.

17. The computer readable medium of claim 14, wherein the routing module comprises at least one selected from a group consisting of, a routing protocol, a routing table, a security protocol, an address resolution utility, and an address translation utility,
wherein the routing table match packet destinations to network paths,
wherein the routing protocol is configured to determine, based on an algorithm, a next hop for each network path stored in the routing table,
wherein the security protocol is configured to authenticate and encrypt packets,
wherein the address resolution utility is configured to identify a hardware address from a network address, and
wherein the address translation utility is configured to modify a network address of the packet, wherein the network address is at least one selected from a group consisting of a source address of a source of the packet and a destination address of the packet destination.

* * * * *

UNITED STATES PATENT AND TRADEMARK OFFICE
CERTIFICATE OF CORRECTION

PATENT NO. : 7,738,457 B2  
APPLICATION NO. : 11/642756  
DATED : June 15, 2010  
INVENTOR(S) : Erik Nordmark et al.

Page 1 of 1

It is certified that error appears in the above-identified patent and that said Letters Patent is hereby corrected as shown below:

In column 7, line 23, after "USA)" insert -- . --.

In column 8, line 21, delete "(122);" and insert -- (122), --, therefor.

In column 9, line 8, delete "1106" and insert -- 106 --, therefor.

In column 17, line 19, in claim 10, delete "NICS" and insert -- NICs --, therefor.

Signed and Sealed this
Twenty-sixth Day of July, 2011

David J. Kappos
*Director of the United States Patent and Trademark Office*